United States Patent Office 3,592,814
Patented July 13, 1971

3,592,814
PHENAZINE DERIVATIVES
Vincent C. Barry, Joan Byrne, James G. Belton, and Michael L. Conalty, Dublin, Ireland, assignors to May & Baker Limited, Essex, England
No Drawing. Filed Sept. 12, 1968, Ser. No. 759,509
Claims priority, application Great Britain, Oct. 26, 1967, 48,797/67
Int. Cl. C07d 51/80
U.S. Cl. 260—267            7 Claims

ABSTRACT OF THE DISCLOSURE

Phenazine derivatives of the formula:

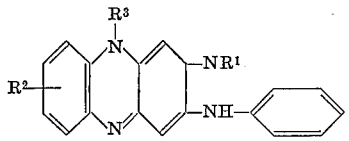

wherein (a) $R^1$ represents isopropyl or phenyl, $R^2$ represents methoxy on position 8 of the phenazine nucleus, and $R^3$ represents phenyl, or (b) $R^1$ represents isopropyl or cyclohexyl, $R^2$ represents chlorine on position 8 of the phenazine nucleus, and $R^3$ represents phenyl, or (c) $R^1$ represents phenyl, $R^2$ represents methoxy on position 7 of the phenazine nucleus, and $R^3$ represents phenyl or p-chlorophenyl, are active against tuberculosis and leprosy.

---

This invention relates to new phenazine derivatives, to processes for their preparation, and to pharmaceutical compositions containing them.

As a result of research and experimentation, it has been found that new phenazine derivatives of the general formula:

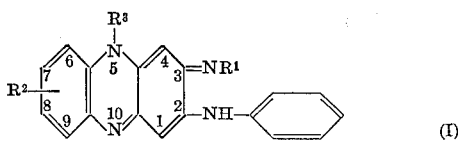

wherein the various symbols have the following definitions:

(a) $R^1$ represents an isopropyl or phenyl group, $R^2$ represents a methoxy group on position 8 of the phenazine nucleus, and $R^3$ represents a phenyl group, or (b) $R^1$ represents an isopropyl or cyclohexyl group, $R^2$ represents a chlorine atom on position 8 of the phenazine nucleus, and $R^3$ represents a phenyl group, or (c) $R^1$ represents a phenyl group, $R^2$ represents a methoxy group on position 7 of the phenazine nucleus, and $R^3$ represents a phenyl or p-chlorophenyl group, possess valuable chemotherapeutic properties, in particular showing a high level of activity against tuberculosis, e.g. that caused by *Mycobacterium tuberculosis*, and leprosy. In laboratory screening methods against infections of *Mycobacterium tuberculosis* in mice, the phenazine derivatives of general Formula I have been found to increase substantially the survival time of infected mice on oral administration in doses of 5 to 20 mg./kg. animal body weight per day in comparison with unmedicated infected animals used as controls. The preferred compound according to the present invention is 2-anilino-8-chloro-3-cyclo-hexylimino-3,5-dihydro-5-phenylphenazine.

The phenazine derivatives of general Formula I are preferably administered orally in the treatment of tuberculosis and leprosy. They may be administered, in the treatment of tuberculosis, in association with known tuberculostatic agents, e.g. streptomycin, isonicotinic acid hydrazide, p-aminosalicyclic acid, 2-ethyl-isothionicotinamide and 2-propylisothionicotinamide, in particular to inhibit the development of resistant strains of mycobacteria, and, in the treatment of leprosy, in association with the known antileprotic agent 4,4'-diaminodiphenylsulphone.

According to a feature of the present invention, the phenazine derivatives of Formula I wherein $R^1$ represents a phenyl group are prepared by the condensation of a substituted o-phenylene diamine of the general formula:

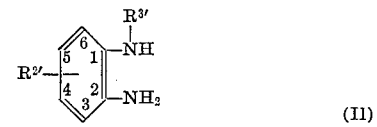

wherein $R^{2\prime}$ represents a methoxy group in the 4- or 5-position and $R^{3\prime}$ represents a phenyl group or, when $R^{2\prime}$ represents a methoxy group in the 5-position, a p-chlorophenyl group, with 4,5-dianilino-o-benzoquinone. The reaction is preferably effected by heating an inorganic acid salt of the compound of Formula II, e.g. a hydrochloride, with one equivalent, or a slight excess thereover, of 4,5-dianilino-o-benzoquinone, in a suitable inert organic solvent, such as an alcohol, e.g. ethanol.

According to a further feature of the present invention, the phenazine derivatives of Formula I wherein $R^3$ represents a phenyl group and $R^1$ is other than a phenyl group, are prepared by the oxidation of a compound of the general formula:

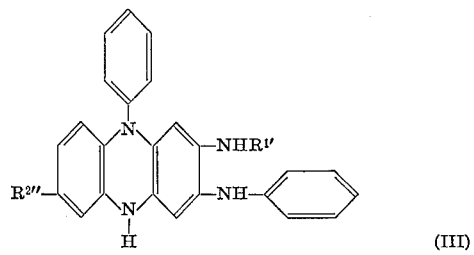

wherein $R^{1\prime}$ represents an isopropyl or cyclohexyl group, and $R^{2\prime\prime}$ represents a chlorine atom or, when $R^{1\prime}$ represents an isopropyl group, a methoxy group. The oxidation is preferably effected by the action of oxygen on a solution of the compound of Formula III in a suitable inert organic solvent such as an alcohol, e.g. ethanol, for example by exposure of the solution to the atmosphere.

Compounds of the general Formula III may be prepared by the reduction by methods known per se of an imidazophenazine of the general formula:

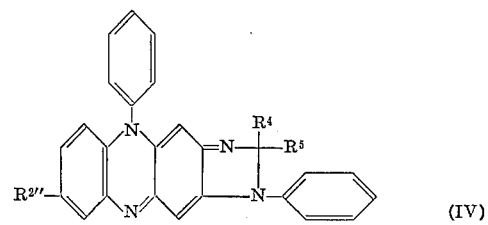

wherein $R^4$ and $R^5$ represent methyl groups or, together with the carbon atom to which they are attached, form a cyclohexyl group and $R^{2\prime\prime}$ represents a chlorine atom or, when $R^4$ and $R^5$ represent methyl groups, a methoxy group. The reduction may be effected, for example, by hydrogenation in the presence of a catalyst such as Adams' platinum dioxide, and a suitable solvent such as an alcohol, e.g. ethanol.

Imidazophenazines of the general Formula IV may be prepared by the oxidation of a salt such as a strong inorganic acid salt, e.g. a hydrochloride, of an o-phenylene diamine of the general Formula II, for example by means of p-benzoquinone, in the presence of a ketone of the general formula:

wherein $R^4$ and $R^5$ are as hereinbefore defined.

According to another feature of the present invention, compounds of Formula I wherein $R^1$ and $R^3$ represent phenyl groups may be prepared by the action of aniline on a compound of the formula:

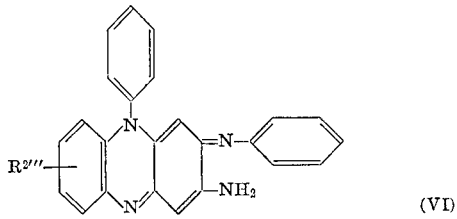

wherein $R^{2'''}$ represents a methoxy group on position 7 or 8 of the phenazine nucleus. The reaction is preferably effected by heating an inorganic acid salt of a compound of Formula VI with an excess of aniline, which also serves as the reaction medium.

The starting material of Formula VI may be prepared by the oxidation of a compound of Formula II, wherein $R^{3'}$ represents a phenyl group. The oxidation is preferably effected by the action of p-benzoquinone or ferric chloride.

By the term "methods known per se" as used in this specification and accompanying claims is meant methods heretofore used or described in the literature.

The following examples illustrate the preparation of the new compounds of the present invention.

EXAMPLE I 2-amino-4'-chloro-5-methoxydiphenylamine hydrochloride (17.1 g.), 4,5-dianilino-o-benzoquinone (17.4 g.; prepared according to V. C. Barry et al., J. Chem. Soc., 1958, 859) and ethanol (600 ml.) were mixed and heated under reflux for two hours. The mixture was cooled and filtered. The precipitate was suspended in ethanol, warmed on a water bath, and made alkaline with ammonium hydroxide solution. The precipitate was filtered off, washed with water and dried. It was recrystallised from benzene to give 2-anilino - 5 - p - chlorophenyl - 3,5 - dihydro - 7 - methoxy-3-phenyliminophenazine (12.7 g.), M.P. 240° C.

2-amino-4'-chloro-5-methoxydiphenylamine hydrochloride, used as starting material in the above preparation, was itself prepared as follows:

4'-chloro-5-methoxy - 2 - nitrodiphenylamine (17.2 g.; prepared according to A. P. Kottenhahn, E. T. Seo, and H. W. Stone, J. Org. Chem, 1963, 28, 3114) and ethanol (220 ml.) were mixed and heated on a water bath. Raney nickel (ca. 4 g.) was added, followed by hydrazine hydrate (2–3 ml.; 99%). Heating was continued and further small quantities of hydrazine hydrate added until the solution became colourless (ca. 1 hour). The catalyst was filtered off, and the filtrate diluted with water was cooled. The colourless product was filtered off and dried. The product was dissolved in diethyl ether and the calculated quantity of concentrated hydrochloric acid added to give a precipitate of 2-amino-4'-chloro-5-methoxydiphenylamine hydrochloride (17.1 g.).

EXAMPLE II 2-amino-5-methoxydiphenylamine hydrochloride (8.5 g.), 4,5-dianilino-o-benzoquinone (10 g.) and ethanol (400 ml.) were mixed and heated under reflux for 2 hours. Part of the ethanol (150 ml.) was removed by distillation and the residue allowed to stand overnight. A precipitate which formed was suspended in boiling ethanol (100 ml.) and treated with an excess of ammonium hydroxide solution to precipitate a base which was filtered off, dried, dissolved in benzene, and chromatographed on alumina to give 2 - anilino - 3,5-dihydro-7-methoxy-3-phenylimino-5-phenylphenazine (4.1 g.), M.P. 226–228° C.

The 2-amino-5-methoxydiphenylamine hydrochloride used as starting material in the above preparation was itself prepared as follows:

Sodium (4 g.) was dissolved in dry methanol (200 ml.) and 5-chloro-2-nitrodiphenylamine (11 g.) added. The mixture was refluxed for 15 hours, cooled, and a yellow precipitate filtered off. After washing with water, and drying, the precipitate was recrystallised from ethanol to give 5-methoxy-2-nitrodiphenylamine (10.5 g.), M.P. 112–113° C. (A. P. Kottenhahn et al., loc. cit. give M.P. 112.6–113.3° C.).

5-methoxy-2-nitrodiphenylamine (16 g.) was reduced with hydrazine and Raney nickel in ethanol in the manner described in Example I for the preparation of 2-amino-4'-chloro-5-methoxydiphenylamine from 4'-chloro - 5 - methoxy-2-nitrodiphenylamine. When the catalyst was filtered off, and the filtrate diluted with water, the base was precipitated as an oil which solidified on standing overnight in a refrigerator. The base was filtered off, dried, dissolved in diethyl ether, and the hydrochloride precipitated by addition of the calculated quantity of concentrated hydrochloric acid. The precipitate was filtered off and dried to give 2-amino-5-methoxydiphenylamine hydrochloride (16 g.).

EXAMPLE III 2,10 - dihydro - 7-methoxy-2,2-dimethyl-3,10-diphenylimidazo-[4,5-b]phenazine (4.2 g.) in suspension in ethanol, was reduced catalytically (Adams' platinum dioxide) in a Parr low pressure hydrogenator at 40 lbs./sq. in, and room temperature. After two mols. of hydrogen had been taken up, the pale green solution was filtered and subjected to aerial oxidation to give 2-anilino-3,5-dihydro-3 - isopropylimino - 8 - methoxy - 5 - phenylphenazine (3.6 g.) as bright red needles, M.P. 166–167° C.

The 2,10 - dihydro - 7 - methoxy-2,2-dimethyl-3,10-diphenylimidazo[4,5-b]phenazine used as starting material in the above preparation was itself prepared as follows.

4-methoxy-2-nitrodiphenylamine (prepared by the method of F. E. King, T. J. King, and I. H. M. Muir, J. Chem. Soc., 1946, 5) was reduced with hydrazine and Raney nickel and converted to the hydrochloride by the method given in Example I, to give 2-amino-4-methoxy-diphenylamine hydrochloride. 10 g. of this product was dissolved in acetone (200 ml.) and water (200 ml.) and to this solution was added a solution of p-benzoquinone (10 g.) in acetone (200 ml.) and water (200 ml.). The benzoquinone was added dropwise with stirring, and the stirring continued for 3 hours. The solution was then made alkaline with sodium hydroxide solution (2%), and the precipitate filtered off, washed with water and dried. It was then dissolved in benzene and chromatographed on alumina. The benzene eluate was concentrated to give orange-red needles which were recrystallised from a mixture of benzene and ethanol to give 2,10-dihydro-7-methoxy-2,2-dimethyl-3,10-diphenylimidazo[4,5-b]phenazine (4.2 g.), M.P. 248–249° C.

EXAMPLE IV 7-chloro-2,10-dihydro-3,10-diphenylimidazo[4,5-b]phenazine-2-spirocyclohexane (5.8 g.) in suspension in ethanol was catalytically hydrogenated over Adams' platinum dioxide catalyst. After uptake of 2 mols. of hydrogen, the pale green solution was filtered and exposed to the atmosphere. Complete oxidation took place on standing and red needles of 2-anilino-8-chloro-3-cyclohexylimino-3,5-dihydro-5-phenylphenazine (5.3 g.), M.P. 180° C., were obtained.

The 7-chloro-2,10-dihydro-3,10 - diphenylimidazo[4,5-b]phenazine-2-spirocyclohexane used as starting material in the above preparation was prepared as follows:

4-chloro-2-nitrodiphenylamine (20 g.; prepared according to F. Ullmann and D. Kogan, Liebigs Ann., 1904, 332, 93) was reduced in ethanolic solution with hydrazine and Raney nickel by the method given in Example I. When colourless, the mixture was filtered and diluted with water. The precipitate was filtered off, dried, dissolved in diethyl ether, and the calculated quantity of concentrated hydrochloric acid added to give 2-amino-4-chlorodiphenylamine hydrochloride (19 g.). 10 g. of this product was dissolved in ethanol (180 ml.), and water (90 ml.). Cyclohexanone (10 ml.) was added, followed by the slow addition, with stirring, of p-benzoquinone (10 g.) in ethanol (100 ml.) and water (25 ml.). Stirring was continued for 3 hours, the solution made alkaline with sodium hydroxide solution (2%), and the precipitate filtered off, washed with water, and dried. The product was purified in benzene solution on an alumina column to give 7-chloro-2,10-dihydro-3,10-diphenylimidazo[4,5 - b]phenazine-2-spirocyclohexane (5.8 g.) as bright orange needles, M.P. 295° C.

EXAMPLE V 2-amino-4-methoxydiphenylamine hydrochloride (2.3 g.; prepared according to the method of Example III), 4,5-dianilino-o-benzoquinone (2.7 g.), and ethanol (120 ml.) were heated under reflux for two hours. The mixture was allowed to cool and filtered. The precipitate was suspended in hot ethanol and treated with an excess of ammonium hydroxide solution to precipitate the base which was dissolved in benzene and chromatographed on alumina to give dark red needles of 2-anilino-3,5-dihydro-8-methoxy-5-phenyl-3-phenyliminophenazine (1.5 g.), M.P. 243–244° C.

EXAMPLE VI 7-chloro-2,10-dihydro-2,2-dimethyl-3,10 - diphenylimidazo[4,5-b]phenazine (2 g.) was suspended in ethanol and hydrogenated over Adams' platinum dioxide catalyst in a Parr low pressure hydrogenator at 40–50 lbs./sq. in. and room temperature. After the uptake of 2 mols. of hydrogen, the green solution was filtered and allowed to oxidise by exposure to the atmosphere. On complete oxidation red needles of 2-anilino-8-chloro-3,5-dihydro - 3 - isopropylimino-5-phenylphenazine (1.8 g.) were obtained, M.P. 205–206° C.

The 7-chloro-2,10-dihydro-2,2-dimethyl-3,10 - diphenylimidazo[4,5-b]phenazine, used as starting material in the above preparation was prepared as follows:

2-amino-4 - chlorodiphenylamine hydrochloride (5 g.; prepared according to Example IV) was dissolved in acetone (50 ml.) and water (50 ml.). This solution was stirred and treated by the dropwise addition of p-benzoquinone (5 g.) in acetone (50 ml.) and water (50 ml.). The mixture was stirred for 2 hours and then made alkaline by the dropwise addition of sodium hydroxide solution (5%). A brown precipitate was filtered, washed with water, and dried. It was then dissolved in benzene and chromatographed on alumina. The first small fraction, a red-purple eluate, as followed by a brown fluorescent eluate which gave, on concentration, orange needles of 7-chloro-2,10-dihydro-2,2-dimethyl-3,10-diphenylimidazo[4,5 - b]phenazine (2.2 g.), M.P. 269–271° C.

The present invention further includes within its scope pharmaceutical compositions which comprise, as active ingredient, one or more compounds of general Formula I, in association with a pharmaceutical carrier or coating. The invention includes especially compositions suitable for oral administration.

Solid compositions for oral administration include compressed tablets (including enteric coated tablets), pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and preserving, perfuming, sweetening and flavouring agents. The compositions according to the invention for oral administration also include capsules of absorbable material such as gelatin containing one or more of the active substances with or without the addition of diluents or excipients.

Preparations according to the invention for topical administration may take the form of ointments, creams, solutions or suspensions, using conventional pharmaceutical carriers such as petroleum jelly and other hydrocarbon fats, and oils, such as olive oil.

The percentage of active ingredient in the compositions of the invention may be varied, it being necessary that it should constitute a proportion such that a suitable dosage for the pharmacodynamic effect desired in the species of animal shall be obtained. Obviously several unit dosage forms may be administered at about the same time and the optimum dosage will vary from subject to subject. In general, the pharmaceutical compositions of the present invention should normally contain at least 10.0% by weight of active substance in the case of compositions suitable for oral administration, and at least 0.1% by weight in the case of compositions suitable for topical application.

Generally, daily doses of 5 to 20 mg./kg. of animal body weight have been shown to have good tuberculostatic and antileprotic activity, but higher, or lower dosages may be used if desired.

The following examples illustrate pharmaceutical compositions according to the present invention:

EXAMPLE VII

Solutions suitable for topical application are prepared as follows:

2 - anilino - 8 - chloro - 3 - cyclohexylimino - 3,5 - dihydro-5-phenylphenazine (10 mg.) is dissolved in dimethylformamide (1 ml.) with gentle warming. One part of this solution is mixed with 9 parts of olive oil.

EXAMPLE VIII

Compositions suitable for oral administration in the form of capsules are prepared by mixing the following ingredients:

|  | G. |
|---|---|
| Micronized 2-anilino - 8 - chloro-3-cyclohexylimino-3,5-dihydro-5-phenylphenazine | 10 |
| Arachis oil | 10.5 |
| Lecithin | 1.0 |
| Beeswax | 0.35 |
| Paraffin wax | 0.65 | by conventional methods to form a paste. This paste is then charged into gelatin capsules at a rate of 450 mg. of paste (200 mg. of active ingredient) per capsule.

Instead of the compound specified in Examples VII and VIII, any other compound within the scope of general Formula I may be used.

We claim:
1. Phenazine derivatives of the formula:

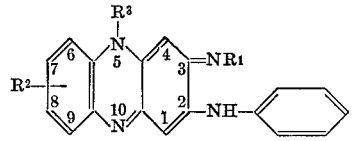

wherein (a) $R^1$ repreesnts isopropyl or phenyl, $R^2$ represents methoxy on position 8 of the phenazine nucleus, and $R^3$ represents phenyl, or (b) $R^1$ represents isopropyl or cyclohexyl, $R^2$ represents chlorine on position 8 of the phenazine nucleus, and $R^3$ represents phenyl, or (c)

$R^1$ represents phenyl, $R^2$ represents methoxy on position 7 of the phenazine nucleus, and $R^3$ represents phenyl or p-chlorophenyl.

2. The phenazine derivative according to claim 1 which is 2 - anilino 5 - p - chlorophenyl - 3,5 - dihydro - 7 - methoxy-3-phenyliminophenazine.

3. The phenazine derivative according to claim 1 which is 2 - anilino - 3,5 - dihydro - 7 - methoxy - 3 - phenylimino-5-phenylphenazine.

4. The phenazine derivative according to claim 1 which is 2 - anilino - 3,5 - dihydro - 3 - isopropylimino - 8 - methoxy-5-phenylphenazine.

5. The phenazine derivative according to claim 1 which is 2 - anilino - 8 - chloro - 3 - cyclohexylimino - 3,5-dihydro-5-phenylphenazine.

6. The phenazine derivative according to claim 1 which is 2 - anilino - 3,5 - dihydro - 8 - methoxy - 5 - phenyl-3-phenylimino-phenazine.

7. The phenazine derivative according to claim 1 which is 2 - anilino - 8 - chloro - 3,5 - dihydro - 3 - isopropylimino-5-phenylphenazine.

References Cited
UNITED STATES PATENTS

| | | | |
|---|---|---|---|
| 2,948,726 | 8/1960 | Barry et al. | 260—267 |
| 3,092,549 | 6/1963 | Girard | 260—267 |

ALEX MAZEL, Primary Examiner

A. M. TIGHE, Assistant Examiner

U.S. Cl. X.R.

424—181, 232, 250